United States Patent [19]

Collingwood

[11] Patent Number: 5,669,151
[45] Date of Patent: Sep. 23, 1997

[54] TRIGGER PROBE CIRCUIT

[75] Inventor: David Collingwood, Stonehouse, United Kingdom

[73] Assignee: Renishaw plc, Gloucestershire, United Kingdom

[21] Appl. No.: 504,310

[22] Filed: Jul. 20, 1995

[30] Foreign Application Priority Data

Jul. 29, 1994 [GB] United Kingdom ............ 9415338

[51] Int. Cl.⁶ .................................................. G01B 21/04
[52] U.S. Cl. .................................................... 33/558
[58] Field of Search .......................... 33/555, 556, 558; 361/272; 333/167, 172

[56] References Cited

U.S. PATENT DOCUMENTS

| | | |
|---|---|---|
| 4,153,998 | 5/1979 | McMurtry . |
| 4,177,568 | 12/1979 | Werner et al. . |
| 4,270,275 | 6/1981 | McMurtry . |
| 4,364,180 | 12/1982 | Willhelm et al. . |
| 4,455,755 | 6/1984 | Fritsche et al. . |
| 4,702,013 | 10/1987 | McMurtry . |
| 4,769,919 | 9/1988 | Lloyd et al. . |
| 4,817,362 | 4/1989 | Archer . |
| 4,916,339 | 4/1990 | Lloyd . |
| 5,024,003 | 6/1991 | Breyer . |
| 5,111,592 | 5/1992 | Aehnelt et al. . |
| 5,272,817 | 12/1993 | Gonzalez . |
| 5,279,042 | 1/1994 | Gonzalez et al. . |
| 5,435,072 | 7/1995 | Lloyd et al. . |

FOREIGN PATENT DOCUMENTS

| | | |
|---|---|---|
| A-0242747 | 10/1987 | European Pat. Off. . |
| A-0301390 | 2/1989 | European Pat. Off. . |
| A2-0420305 | 4/1991 | European Pat. Off. . |
| A-0420416 | 4/1991 | European Pat. Off. . |
| A1-0501680 | 9/1992 | European Pat. Off. . |
| A1-0501681 | 9/1992 | European Pat. Off. . |
| 0 556 574 | 8/1993 | European Pat. Off. . |
| A1-0605140 | 7/1994 | European Pat. Off. . |
| A-2384230 | 10/1978 | France . |
| A-61200418 | 5/1986 | Japan . |
| 61-047502 | 8/1986 | Japan . |
| 2155620 | 9/1985 | United Kingdom . |
| A-2155620 | 9/1985 | United Kingdom . |
| A-2163850 | 3/1986 | United Kingdom . |
| WO-A-8801726 | 3/1988 | WIPO . |

OTHER PUBLICATIONS

Patent Abstract of Japan, vol. 11 No. 11 (E–470), JP61185067 Aug. 18, 1986.

Information Disclosure Statement Appendix, pp. 1–4.

*Primary Examiner*—G. Bradley Bennett
*Attorney, Agent, or Firm*—Oliff & Berridge

[57] ABSTRACT

A trigger probe 10 has electrical contacts which open when the probe contacts a workpiece. This is detected by a comparator 17 to produce a trigger signal. If spurious signals are generated at the probe contacts as a result of vibration, these are filtered out by a capacitor C1, which charges up when the contacts open and introduces a time delay. When the probe contacts re-close after a normal trigger operation, the capacitor C1 is discharged through a discharge circuit, e.g. transistor TR1, so that the energy stored on the capacitor does not damage the probe contacts.

8 Claims, 1 Drawing Sheet

TRIGGER PROBE CIRCUIT

FIELD OF THE INVENTION

This invention relates to trigger probes of the type used on position determining apparatus, such as coordinate measuring machines and machine tools.

DESCRIPTION OF PRIOR ART

Such probes have a deflectable workpiece-contacting stylus. When the stylus contacts a workpiece, a trigger signal is issued to the position determining apparatus, to cause it to take a reading of the position of the probe. The probe may have, for example, electrical contacts which change state when the stylus touches the workpiece. U.S. Pat. No. 4,153,998 describes such a probe, having three sets of contacts wired in series, which are normally closed. When the stylus contacts the workpiece, one or more of the electrical contacts opens to generate the trigger signal.

FIG. 1 shows schematically such a probe 10. In normal use, the probe 10 is connected to an interface circuit 12. Such an interface 12 conventionally contains a resistor R1 in series with the contacts of the probe 10 between a positive supply rail +V and a ground rail 0V. A line 16 from an input terminal 14 between the resistor R1 and the probe 10 is connected to a comparator circuit 17. When the contacts of the probe 10 are closed (i.e. the normal state) the line 16 is connected to the 0V rail. When the stylus of the probe 10 contacts a workpiece, its contacts start to open and the resistance across them increases. The contact resistance is then in a voltage divider arrangement with the resistor R1, and the comparator 17 generates the trigger signal when the contact resistance rises through a predetermined threshold.

A problem can arise if the position determining apparatus on which the probe 10 is mounted is subject to vibration, which is often so in the case of machine tools. The vibration acting on the stylus of the probe 10 can cause tiny movements at the electrical contacts, resulting in momentary increases in the contact resistance. If the contact resistance should rise momentarily above the threshold detected by the comparator 17, false trigger signals can be generated as a result.

SUMMARY OF THE INVENTION

The present invention provides a trigger probe circuit for a trigger probe for position determining apparatus, comprising two input terminals for connection to an output of the probe, and characterised by a capacitor connected across the input terminals, whereby the capacitor filters out momentary, spurious changes in the probe output signal.

Although reference is made herein to the probe output, it will be appreciated that the above circuit may actually be built into the housing of the probe itself, or there may be signal transmission circuits between the probe and the interface. In such cases the terms "probe output" and "output of the probe" should be construed as meaning an output from a part of the probe circuit occurring before the circuit of the invention, and the term "input terminals" should be construed accordingly.

BRIEF DESCRIPTION OF THE DRAWINGS

Preferred embodiments of the invention will now be described. In the accompanying drawings.

DESCRIPTION OF PREFERRED EMBODIMENTS

Figure 1:
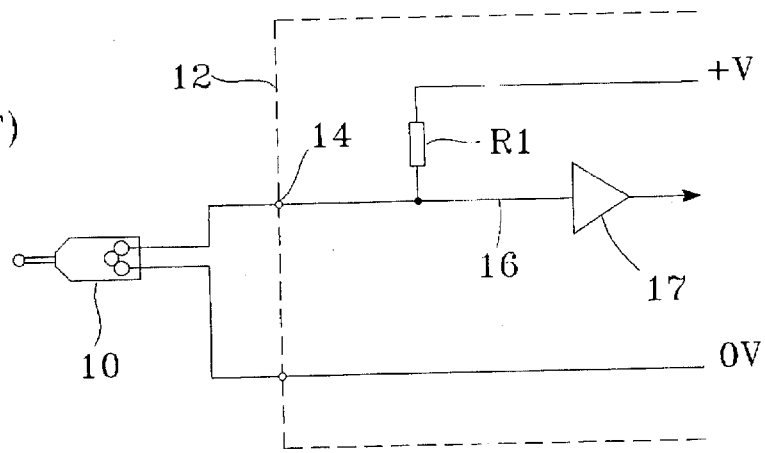
FIG. 1 is a schematic diagram of a prior probe circuit.

A simple solution to the problem of false trigger signals in the circuit of FIG. 1 is as follows. A capacitor is provided within the interface 12, connected across the contacts of the probe 10 between the lines 16 and 0V. The effect is to introduce a delay between the time when the probe contacts open and the time when the trigger signal is generated by the comparator, the length of the delay being governed by the time constant of the resistor R1 and the capacitor. Momentary changes in the resistance of the probe contacts, lasting for less than this time delay, cannot therefore generate false trigger signals. The resistor and capacitor act as a filter to damp out the effects of vibration.

However, this simple solution causes a further problem in practice. When the stylus of the probe 10 is moved out of contact with the workpiece, and the probe contacts re-close, all the energy stored in the capacitor is dissipated through these contacts. This can cause damage to the probe contacts, and reduce the lifespan of the probe.

Figure 2:
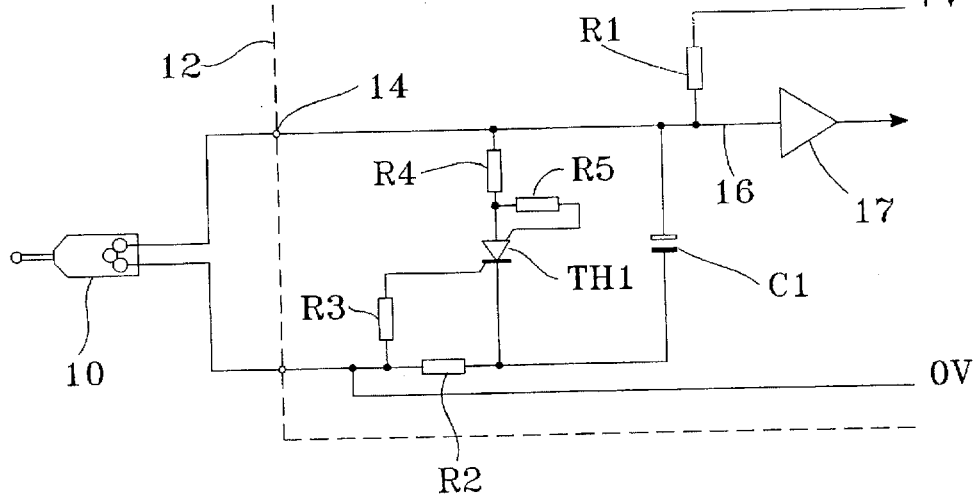
FIGS. 2 and 3 are schematic diagrams of two alternative circuits according to the invention.

To solve this further problem, FIG. 2 shows an interface circuit 12 connected to a probe 10, containing a resistor R1 similar to FIG. 1, and a capacitor C1 as described above. In addition, however, a resistor R2 is placed in series with capacitor C1, between the capacitor and the 0V connection to the probe 10. This resistor limits the discharging of the capacitor C1 through the contacts of the probe 10 when they re-close.

A thyristor TH1 is provided in parallel with capacitor C1. It has a gate resistor R3 connected to the 0V side of the resistor R2. A small value resistor R4 (e.g. 10Ω) may be connected in series with the thyristor TH1.

Operation of the circuit is as follows. When the contacts of the probe 10 open as a result of contact with a workpiece, the capacitor C1 charges up through the resistors R1 and R2. After a predetermined time delay, the voltage on line 16 has risen above a predetermined threshold, at which a comparator 17 generates a trigger signal. This predetermined time delay damps out momentary changes in the resistance of the contacts of the probe 10, as described above.

When the contacts of the probe 10 re-close, the voltage on capacitor C1 now appears across the resistor R2. This causes the thyristor TH1 to be turned on via its gate resistor R3. The capacitor C1 now discharges through the thyristor TH1 and resistor R4. The thyristor TH1 will only turn off when this discharging is completed.

The resistor R4 could be omitted, but its presence limits slightly the rate of discharge of the capacitor C1 and thus helps to prolong its life.

Thyristors are of course four-layered devices, although terminal connections are normally only provided to three of the four layers. However, in a practical embodiment which has been constructed, a surface mount type of thyristor was used, in which connections were provided to all four layers. To prevent the possibility of unreliability which might arise if the unused connection were allowed to float freely, we provided a clamping resistor R5. However, it will be appreciated that this clamping resistor would be unnecessary if a three terminal device is used.

If the voltage across the capacitor C1 has only built up to a relatively small value at the time when the probe contacts re-close, and is insufficient to trigger the thyristor TH1, then the capacitor discharges through R2 and the probe contacts. The value of R2 is chosen so as to prevent the flow of currents large enough to reduce the life of the contacts, but at the same time discharge the capacitor at a reasonably high rate. Suitably, the value of resistor R2 may be chosen (relative to resistor R1) so that the capacitor will discharge at 20 or 40 times the rate of which it charges up. Of course, the capacitor will discharge much more quickly when discharged via the thyristor TH1.

Figure 3:
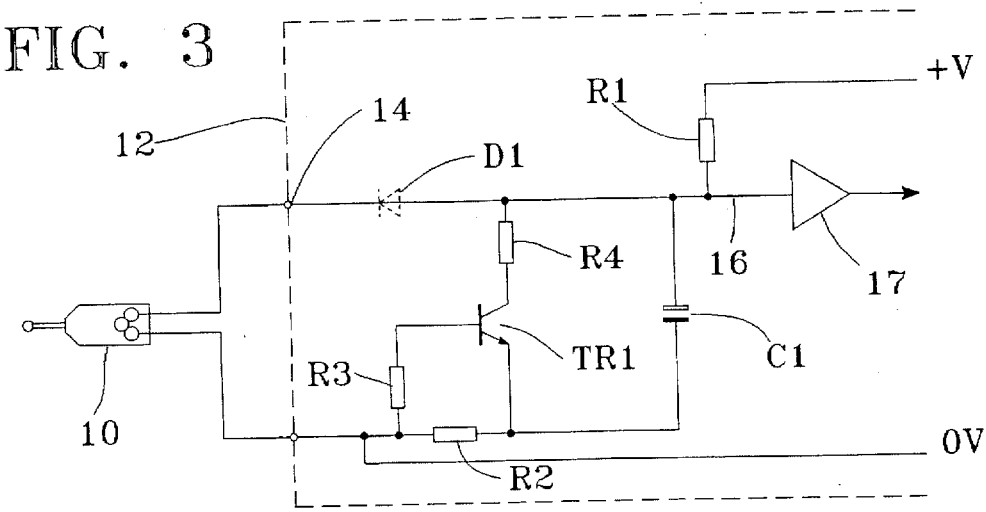

FIG. 3 shows an alternative circuit to FIG. 2, in which similar components have been given the same reference numbers. The major difference is that instead of the thyristor TH1, FIG. 3 shows a transistor TR1. The resistor R3 is connected to the base of the transistor TR1, and switches the transistor on when the probe contacts close and the full voltage of the capacitor C1 appears across the resistor R2. As previously, this causes the capacitor to discharge through the small value resistor R4 which is connected to the collector of transistor TR1.

The transistor circuit of FIG. 3 has an advantage, because unlike the thyristor circuit of FIG. 2, the transistor does not become latched into the "on" state. Thus, if a spike of external electromagnetic interference occurs when the probe contacts are open, the transistor will not latch on and cause premature discharge of the capacitor.

The figures have shown the contacts of the probe 10 connected directly to the circuits described within the interface 12. However, this is not essential. The circuits of FIGS. 2 and 3 may be built into the probe itself, as previously mentioned. If it is desired to use just a simple capacitor across the probe contacts, it is also possible to build this into the probe itself. In another alternative, the probe 10 may be connected to the interface 12 via a wireless signal transmission system. A known signal transmission system, for example, transmits the probe signals inductively across a small gap between two coils, one mounted on the probe and another mounted on the spindle of the machine tool to which the probe is connected. There is then further electronic circuitry associated with the signal transmission system located between the spindle mounted coil and the interface 12. The output of this known circuitry does not simply provide an open circuit connection when the probe contacts are open; instead it connects the input terminal 14 of the interface to the positive supply rail +V.

As shown in FIG. 3, therefore, if the present probe damping circuit is to be connected to such a signal transmission system, a diode D1 may be provided between the input terminal 14 and the rest of the interface circuit. This ensures that the capacitor C1 is charged up only through the resistor R1, and not from the positive supply rail in the signal transmission system. A diode may be provided in the same manner in the circuit of FIG. 2, if desired.

In practice, the capacitor C1, thyristor TH1 and resistors R2–R5 shown in FIG. 2 may be built on a small separate circuit board having flying leads for retrofit connection to the appropriate points in an existing interface 12. Similarly, the components C1,TR1,R2–R4 of FIG. 3 may be provided on a separate circuit board with flying leads. If provided, the diode D1 may be built on the same board. The board may have provision for locating alternative capacitors of different sizes in the position of capacitor C1. It is thus possible to use a relatively small value of capacitor, giving a short time delay, if a particular machine has only a small vibration problem, and to fit a larger capacitor if a machine has a more significant vibration problem.

We have found that setting the time delay to between about 6 msec and about 8 msec is usually sufficient to filter out false trigger signals. We have also found that the circuits described will produce a reasonably repeatable time delay. This is important, since provided the probe is moved towards the workpiece at a constant speed, the extra distance travelled before the trigger signal is generated will also be repeatable. This extra distance is therefore removed from the measurements by the normal step of calibrating or "datuming" the probe before use. For the highest possible measurement repeatability, it can be desirable to move the probe towards the workpiece at a slow speed. In choosing the probe speed, it may also be necessary to consider the safe braking distance, as the contact with the workpiece is only detected and braking action initiated after the end of the time delay.

A further advantage of the circuits described is that they will reduce the incidence of false trigger signals caused by electrical interference spikes, as well as by vibration.

I claim:

1. A trigger probe circuit for a trigger probe for position determining apparatus, comprising two input terminals for connection to an output of the probe, a capacitor connected across the input terminals, and a discharge circuit in parallel with the capacitor, whereby the capacitor filters out momentary, spurious changes in the probe output signal and the capacitor discharges substantially through said discharge circuit rather than into the probe output when the probe output presents a short circuit.

2. A circuit according to claim 1, including a resistor in series with the capacitor across the input terminals, the charge on the capacitor causing a voltage to appear across said resistor when the probe output presents a short circuit, said voltage acting on the discharge circuit to cause it to discharge the capacitor.

3. A circuit according to claim 1, wherein the discharge circuit comprises a thyristor.

4. A circuit according to claim 1, wherein the discharge circuit comprises a transistor.

5. A circuit according to claim 1, wherein the capacitor causes a time delay to the probe output signal.

6. A circuit according to claim 5, wherein the time delay is about 6 msec to 8 msec.

7. A trigger probe for position determining apparatus, including a device for producing a probe output trigger signal when the probe contacts a workpiece; and a circuit comprising, two input terminals for receiving said probe output trigger signal, a capacitor connected across the input terminals, and a discharge circuit in parallel with the capacitor, whereby the capacitor filters out momentary, spurious changes in the probe output signal and the capacitor discharges substantially through said discharge circuit rather than into the probe output when the probe output presents a short circuit.

8. A trigger probe according to claim 7, wherein said device comprises electrical contacts which produce the probe output signal when operated.

* * * * *